United States Patent [19]

Gizzarelli, Sr.

[11] 4,195,694
[45] Apr. 1, 1980

[54] RESCUE VEHICLE

[76] Inventor: Nicholas Gizzarelli, Sr., 195 Prince's Hill Ave., Barrington, R.I. 02806

[21] Appl. No.: 933,784

[22] Filed: Aug. 14, 1978

[51] Int. Cl.² .......................... A62C 25/00; B64D 1/08
[52] U.S. Cl. ........................................ 169/70; 169/53; 182/129; 182/142; 182/150; 244/137 P
[58] Field of Search ............ 244/137 R, 137 P, 119 P, 244/136, 1 TD; 169/53, 70; 182/142, 150, 230, 129, 12, 13, 16, 63

[56] References Cited

U.S. PATENT DOCUMENTS

| | | | |
|---|---|---|---|
| 845,301 | 2/1907 | Von Hoffman | 182/142 |
| 847,965 | 3/1907 | Miller | 244/51 |
| 1,027,724 | 5/1912 | Haney | 182/142 |
| 1,073,293 | 9/1913 | Sideman | 182/142 |
| 1,609,762 | 12/1926 | Morgan | 169/53 |
| 3,220,482 | 11/1965 | Eveleth | 244/136 |
| 3,393,769 | 7/1968 | Springer | 182/82 |
| 3,931,868 | 1/1976 | Smith, Jr. | 244/137 R |
| 3,997,135 | 12/1976 | Peterson | 244/137 R |

OTHER PUBLICATIONS

"Power Driven Spider Stagings", Spider Staging Sales Co., Renton, Washington, 10-9-73.

*Primary Examiner*—Galen L. Barefoot
*Attorney, Agent, or Firm*—Robert J. Doherty

[57] ABSTRACT

A rescue vehicle or safety apparatus is disclosed which in its most basic form includes a self-propelled platform adapted to be suspended from a vertically directed line in turn connected to a movable or stationary point thereabove. So attached, the platform may be accurately maneuvered under its own power from a position somewhat laterally removed from the locus of an emergency such as a fire in a tall building or the like, to a position immediately adjacent the window or other opening in the building such that persons trapped therein may be moved directly into the rescue vehicle and accordingly be removed to safety. The vehicle may also be used for fire fighting and combating other emergency situations such as grain elevator explosions, oil tanker and other fires at sea, etc. and would normally be transported and directed in its use position by means of a helicopter, although not limited thereto. The platform generally includes a mechanism for temporarily contacting the area of the building proximal the emergency location as well as fire fighting and related rescue equipment.

9 Claims, 5 Drawing Figures

RESCUE VEHICLE

BACKGROUND AND SUMMARY OF THE INVENTION

This invention relates to a safety apparatus and particularly to a rescue vehicle which may be utilized in rescuing persons in emergency situations such as those trapped in elevated portions of a building which is on fire. Fires in high-rise buildings are a commonplace occurence and can result in the needless injury or death of persons trapped therein and unable to be rescued therefrom because of the limited height to which available rescue equipment such as ladders and other conventional equipment may extend. The upper limit of ladders available for such rescue operation generally is in the range of 60 to 90 feet, and thus certainly not adequate for rescue operations in high-rise buildings normally extending to far greater height. One attempt to extend the height to which such rescue operations can be carried out was reported in the Providence Journal Evening Bulletin on May 14, 1975 and relates to a vehicle mounted aerial platform identified as "The Moonshot 150" which its developers say can reach a height of 150 feet and carry out rescue operations up to the 16th floor of high-rise buildings. The above citation and discussion constitutes applicant's Prior Art Disclosure and in such regard, a copy of the above-referred to article is included with the filing of this application.

The above discussed prior art devices, however, are extremely expensive and cumbersome in operation; and, of course, cannot be used for rescue and/or fire combating tasks at heights greater than the finite limits thereof. Accordingly, a need exists for a device which can be utilized to rescue those trapped in high-rise buildings because of fire or other emergencies regardless of the height at which such emergency exists. It is accordingly a primary object of the present invention to provide a rescue vehicle of relatively straightforward and low cost construction which can be utilized to rescue persons trapped and/or combat emergencies present in high-rise structures regardless of the height at which such emergency occurs.

A further object of the present invention is the provision of a rescue vehicle of the aforementioned type which can be further easily and conveniently transported to the scene of the emergency in a conventional manner along city streets and the like.

These and other objects of the present invention are accomplished by the provision of a device including a platform adapted for pivotal suspension from a vertically remote position thereabove so as to position the platform in a first position laterally offset from the locus of such emergency in a high-rise structure. The platform includes self-contained propulsion means mounted thereon such that the platform may be propelled along the arc permitted by such pivotal suspension to a second position proximate to the locus of the emergency whereby people trapped therein may move from the building into the rescue vehicle or the vehicle may be used to more effectively combat the emergency such as through the provision of fire fighting equipment provided thereon.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
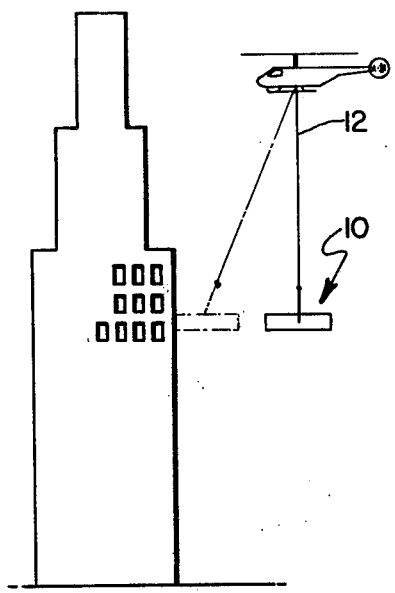
FIG. 1 is a somewhat schematic view illustrating a preferred manner in which the rescue vehicle or safety apparatus of the present invention may be utilized.
Figure 2:
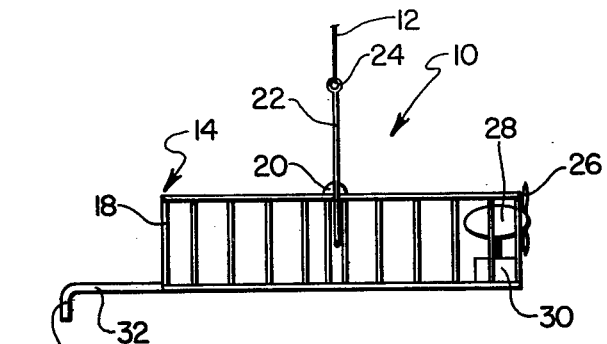
FIG. 2 is also a somewhat schematic view of one form which the rescue vehicle of the present invention may take.
Figure 2A:
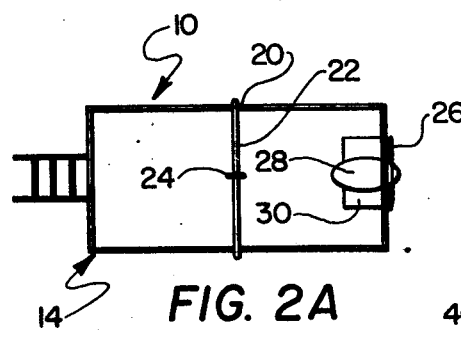
FIG. 2A is a top plan view thereof.

Turning now to the drawing and particularly FIG. 1 thereof, the rescue vehicle or safety apparatus 10 of the present invention is depicted as being suspended from a helicopter by means of a line 12. The full line showing of such vehicle is in a first position laterally offset from the high-rise building shown generally at the level or horizontal plane at which an emergency such as fire or the like is occurring. While so suspended, the vehicle is movable by self-contained propulsion means in a manner that will hereinafter be described to a second position approximate the locus of the emergency as shown in the dotted line representation of FIG. 1. Instead of being suspended by a helicopter hovering overhead, the vehicle 10 could be suspended from a dirigible or a secondary line (not shown) suspended between two adjacent buildings, a circumferential frame of the building or by any other means for practically suspending the vehicle in the position shown. Additionally, the vehicle can either be manipulated directly by a fireman or rescue person on board or such manipulation can occur remotely by equipment on the vehicle remotely controlled by the helicopter or some other control area as may be accomplished by state of the art devices.

The vehicle 10 includes a platform 14 in turn including a generally horizontally disposed base wall 16 from which sidewalls 18 upwardly extend generally from the periphery thereof. The sidewalls 18 are preferably of open construction, that is, formed in an open or mesh-like arrangement so as to increase the visibility of the interior portions of the platform so formed as well as to reduce the wind resistance as the platform travels in its arc-like path by reason of its being tethered to the line 12 much in the manner of a pendulum. The platform is also preferably of light-weight and fireproof construction, and accordingly, the sidewalls 18 may be formed from light-weight metal rods or tubes welded at various points to form a strong generally rigid platform.

Connectors 20 are provided on opposite sides of the platform to which a bail 22 is attached so that the platform 14 is free to pivotally move with respect to the line 12. The top of the bail is provided with an eyelet or other connector 24 through which the line 12 is attached thereto. The rear portion of the platform is provided with a propulsion propeller 26 so as to provide a forward thrust to the platform when rotated as by motor 28 connected thereto by means of a support structure 30. The motor or engine 28 may be powered by propane or other compressed gas supply, or may be gasoline or otherwise powered. The forward end of the platform includes a horizontally orientated ladder 32 outwardly extending therefrom and terminating in a hooked end 34.

It may thus be apparent that the platform 14 may be powered by reason of the propeller 26 in an arcuate path from its first position laterally displaced from the point of emergency in the building to a second location proximate and in contact with the building such that people trapped therein may move from windows or other building openings directly into the platform. The extension or ladder 32 may be used to break windows or the like and the hooked end 34 may be engaged to windowsills and the like for temporarily attaching the platform to the side of the building.

Figure 3:
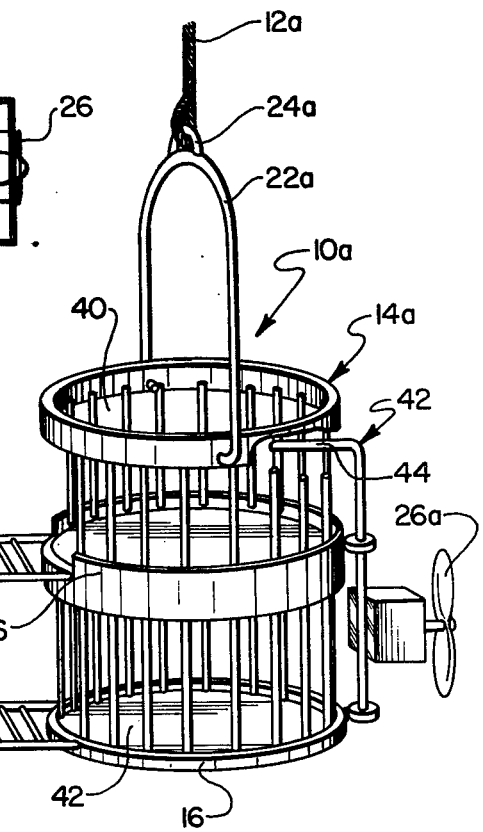
FIG. 3 is a perspective view of an alternate form of the rescue vehicle of the present invention.

Turning now to FIG. 3 of the drawing, an alternate embodiment of the invention is depicted. Therein a vehicle 10a is shown as including a platform 14a which is of generally cylindrical shape and includes base walls 16a and 16b in generally tiered relationship to each other so as to form upper and lower compartments 40 and 42, respectively. In such embodiment or in the other embodiments hereindiscussed, the propulsion means in the form of a propeller 26a and a motor 28a may be mounted outwardly of the platform 14a and is controlled from the top compartment 40 by control means 42 including a swivel handle 44. The forward end of the platform 14a includes a pair of ladders or extensions 32a and it is contemplated in such construction that a rescue person will operate the device from the upper compartment 40 while those persons being rescued will be able to move directly into the lower compartment 42 via the lower ladder 32a.

Figure 4:
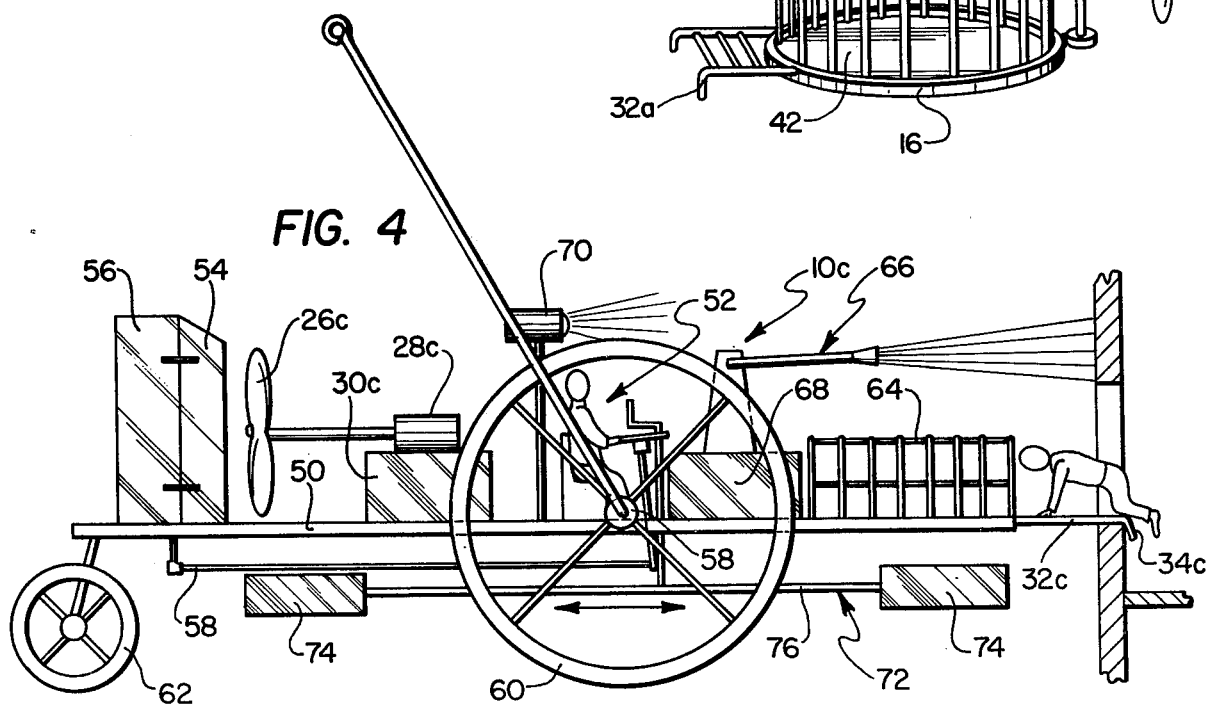
FIG. 4 is a side elevational view of a still further alternate construction form which the rescue vehicle of the present invention may take.

Turning now to FIG. 4 of the drawing, a still further alternate embodiment of the invention is shown. Therein, a vehicle 10c is depicted and includes a platform 50 of generally elongated configuration. Centrally of the platform 50 is a control station 52 wherein a rescue person may control the attitude of the platform as well as the various equipment provided thereon as will hereinafter be more fully brought out. Rearwardly of such station 52 propulsion means in the form of a propeller 56c rotated by a motor 28c in turn mounted to the platform 50 by means of a support 30c which in turn may also house a fuel supply, is positioned. Additionally, a rudder 54 is provided to the rear of the propeller 26c, which rudder 54 includes a pivotal segment or portion 56, the attitude of which may be controlled by suitable linkage 58 by the operator in the control station 52.

The central portion of the platform 50 is also provided with an axle 58 extending transversely thereacross and supporting at opposed ends a pair of large wheels 60 which serve to support the vehicle 10c while positioned on the ground. For such purpose, a rear wheel 62 is also provided, such rear wheel downwardly extending from a rear portion of the platform 50. In this regard, a bail 22c is also attached to opposite ends of the axle 58 or some other position at or near the weight center of the platform 50. The bail 22c is pivotal about its point of connection with the platform 50 and thus may be moved to a position above the vehicle 10c so that such may be attached to a line (not shown) through an eyelet 24c provided for such purpose and accordingly used in the fire fighting and rescue modes abovedescribed in connection with the other embodiments of the invention. The bail 22c may also be pivotally moved to an alternate position generally in line with the platform 50 with the eyelet or opening 24c thereof disposed forwardly thereof such that the vehicle 10c may be towed to a rescue operation along the city streets as by fire fighting apparatus.

The forward end of the platform 50 is provided with a rescue cage 64 of open-mesh or tubular construction into which the person or people to be rescued may directly enter from the building. An extension 32c including a hook portion 34c is provided for the purpose previously discussed. In addition, the vehicle 10c or the vehicles 10 and 10a may also be provided with various fire fighting and other related rescue equipment such as an extinguisher 66 for directing extinguishing fluid towards the fire, which fluid may be water, stored either in a storage tank 68 or provided through a hose or other connecting line (not shown) associated with the tether line 12. While only extinguisher 66 has been provided, it should be brought out that extinguishers of other types to fight various fires such as foam and the like may be provided instead of water or in addition thereto. Furthermore, the vehicle is provided with a light 70, and various radio and related loudspeaker communications equipment also operator controlled through various functional interconnections in the control station 52.

Inasmuch as the vehicle in being propelled to its second active rescue position in temporary contact with the structure undergoing the emergency in an arcuate path by reason of its pendulum-like suspension from the helicopter or other position means thereabove, its balance normally would change between such positions. So as to effect the maintenance of the platform in a level attitude, a ballast system 72 is provided in which weights 74 positioned at the forward and rear ends of the platform may be horizontally shifted with respect thereto by means of appropriate mechanical linkage 76 also controlled by the operator. The ballast system may alternatively be hydraulically controlled.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. Safety apparatus for enabling the rescue from and/or combating emergencies such as fires in normally inaccessible locations as in high-rise structures and the like, comprising a platform, pivotal suspension means including an attachment line for pivotally suspending said platform from a vertically remote position thereabove so as to position said platform in a first position laterally offset from the locus of said emergency in said structure, propulsion means mounted on said platform for propelling said platform along the arc permitted by said line laterally to a second position proximate to said locus, and means projecting from the forward end of said platform for temporarily engaging said platform to said structure at the locus of said emergency whereby people trapped in said structure may move to said platform, said platform including a generally centrally mounted axle in turn supporting a pair of wheels mounted on opposite sides of said platform so as to enable said apparatus to be rollingly supported by surfaces such as city streets and the like, said pivotal suspension means including a pivotal yoke alternatively movable from an upright position wherein the apparatus may be suspended from said line and an alternate generally horizontal position wherein the yoke may be attached to a vehicle or the like for trailer connected movement thereby.

2. The safety apparatus of claim 1, said propulsion means mounted on that end of said platform distal from the end at which said platform engaging means is disposed.

3. The safety apparatus of claim 1, said propulsion means being a self-contained unit including a propeller pitched for forward thrust and means for driving said propeller so as to drive said platform laterally toward said structure.

4. The safety apparatus of claim 1, said platform having peripheral walls upstanding therefrom, said walls of open mesh-like construction so as to simultaneously reduce air resistance and provide greater visibility.

5. The apparatus of claim 1, said platform including ballast means for maintaining said platform in a generally horizontal position as it moves between said first and second positions.

6. The apparatus of claim 1, said platform having fire fighting equipment including fire extinguishing materials and the means for directing said materials towards said locus, light means and communication means.

7. The apparatus of claim 2, said propulsion means including a rudder for controlling the lateral movement of said platform.

8. The apparatus of claim 1, said propulsion means being mounted for pivotal movement within a generally horizontal plane whereby the travel direction of said platform may be in part controlled thereby.

9. The apparatus of claim 1, said yoke being rigid and angularly movable to intermediate positions between said upright and said generally horizontal positions so as to enable said platform to assume a horizontal position when said line supports said yoke in said intermediate positions.

* * * * *